(12) United States Patent
Thompson et al.

(10) Patent No.: US 10,132,643 B2
(45) Date of Patent: *Nov. 20, 2018

(54) MAPPING ROAD ILLUMINATION

(71) Applicant: HERE Global B.V., Eindhoven (NL)

(72) Inventors: Joshua Thompson, Chicago, IL (US);
Yunjie Zhao, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,872

(22) Filed: Dec. 20, 2017

(65) Prior Publication Data

US 2018/0135997 A1 May 17, 2018

Related U.S. Application Data

(63) Continuation of application No. 15/489,178, filed on Apr. 17, 2017, now Pat. No. 9,891,071, which is a
(Continued)

(51) Int. Cl.
G01C 21/36 (2006.01)
G01C 21/34 (2006.01)
(Continued)

(52) U.S. Cl.
CPC ......... *G01C 21/367* (2013.01); *B60Q 1/1423* (2013.01); *B60W 40/06* (2013.01);
(Continued)

(58) Field of Classification Search
CPC .. G01C 21/367; G01C 21/32; G01C 21/3602; G01C 21/3691; G01C 21/3453;
(Continued)

(56) References Cited

U.S. PATENT DOCUMENTS 5,022,701 A 6/1991 Thompson, II
6,577,937 B1 6/2003 Shuman et al.
(Continued)

FOREIGN PATENT DOCUMENTS

DE 102014210496 A1 12/2015
EP 0156665 10/1985
(Continued)

OTHER PUBLICATIONS

European Search Report for related European Application No. 17157552.5 dated Jul. 24, 2017.
(Continued)

*Primary Examiner* — Russell Frejd
(74) *Attorney, Agent, or Firm* — Lempia Summerfield Katz LLC

(57) ABSTRACT

A method and apparatus for providing navigation services including illumination data. A request for a route is received with one or more preferences related to illumination for the route. One or more road segments that have illumination road attributes that correspond to the one or more preferences are selected. The illumination road attributes are calculated as a function of high beam frequency for the one or more road segments. The route is generated including the one or more road segments. The route is provided with the illumination road attributes.

20 Claims, 10 Drawing Sheets

Related U.S. Application Data continuation of application No. 15/053,548, filed on Feb. 25, 2016, now Pat. No. 9,651,390.

(51) Int. Cl.
*G01C 21/32* (2006.01)
*G06F 17/30* (2006.01)
*G06K 9/00* (2006.01)
*F21S 41/60* (2018.01)
*B60Q 1/14* (2006.01)
*B60W 40/06* (2012.01)

(52) U.S. Cl.
CPC ............. *F21S 41/60* (2018.01); *G01C 21/32* (2013.01); *G01C 21/34* (2013.01); *G01C 21/3453* (2013.01); *G01C 21/3602* (2013.01); *G01C 21/3691* (2013.01); *G06F 17/30241* (2013.01); *G06K 9/00798* (2013.01); *B60W 2550/402* (2013.01)

(58) Field of Classification Search
CPC ............ G06F 17/30241; B60W 40/06; B60W 2550/402; B60Q 1/1423; G06K 9/00798; F21S 41/60
See application file for complete search history.

(56) References Cited

U.S. PATENT DOCUMENTS

| | | |
|---|---|---|
| 7,565,006 B2 | 7/2009 | Stam et al. |
| 7,653,215 B2 | 1/2010 | Stam |
| 2005/0065711 A1 | 3/2005 | Dahlgren et al. |
| 2013/0148368 A1 | 6/2013 | Foltin |
| 2014/0236482 A1 | 8/2014 | Dorum et al. |
| 2014/0347872 A1* | 11/2014 | Foltin ................ G06K 9/00825 362/466 |
| 2015/0166072 A1 | 6/2015 | Powers et al. |
| 2015/0344038 A1 | 12/2015 | Stenneth et al. |
| 2016/0193956 A1* | 7/2016 | Foltin .................... B60Q 1/143 362/466 |

FOREIGN PATENT DOCUMENTS

| | | |
|---|---|---|
| JP | 2006300571 A | 11/2006 |
| WO | WO2012040134 | 3/2012 |
| WO | WO2012062764 | 5/2012 |
| WO | WO2014051907 | 4/2014 |
| WO | WO2014158411 | 10/2014 |
| WO | WO2015166721 A1 | 11/2015 |

OTHER PUBLICATIONS

Tran etal, Inter-Vehicle Communication, Lecense Plate Verification, and Distance Estimation for the Construction of Driving Surroundings, Nov. 2014, ResearchGate.

Yi, Shockwave Models for Crowdsourcing-Based Traffic Information Mining, Apr. 7-10, 2013, ieeeexplore.com.

European Office Action for European Patent Application No. 17157552.5-1003, dated Jun. 16, 2018.

* cited by examiner

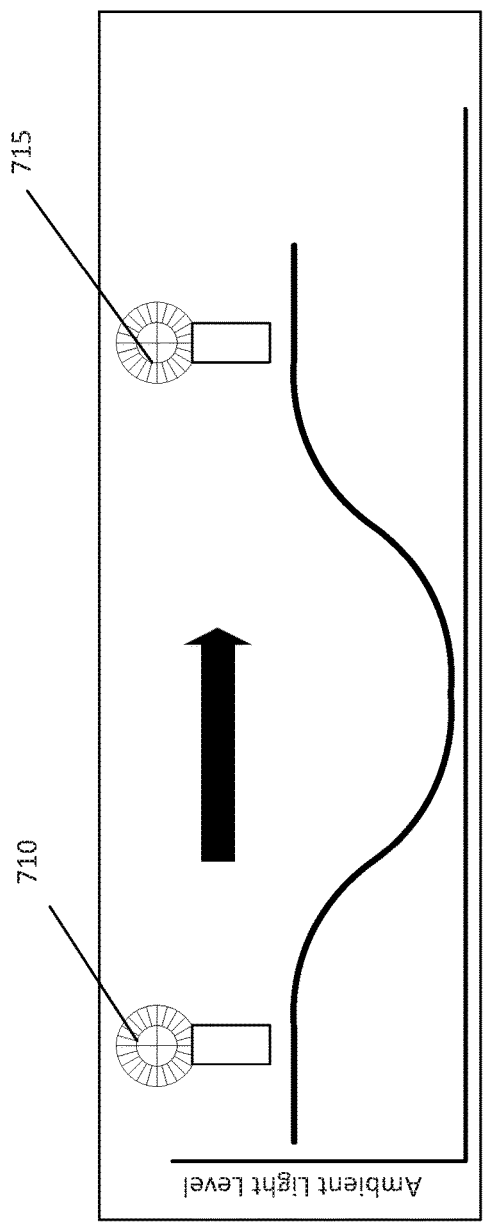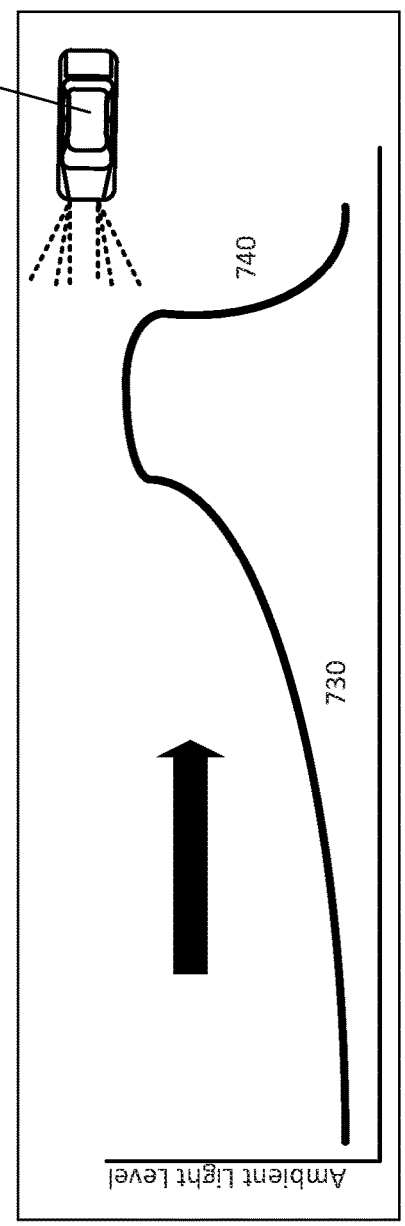
FIG. 9A
FIG. 9B

MAPPING ROAD ILLUMINATION

CROSS REFERENCE TO RELATED APPLICATIONS

This application is a continuation under 35U.S.C § 120 and 37 C.F.R. § 1.53(b) of U.S. patent application Ser. No. 15/489,178 filed Apr. 17, 2017 now U.S. Pat. No. 9,891,071, which is a continuation of U.S. patent application Ser. No. 15/053,548 filed Feb. 25, 2016 now U.S. Pat. No. 9,651,390, the entire disclosures of which are hereby incorporated by reference in their entirety.

FIELD

The following disclosure relates to vehicular high beam usage, mapping, and navigation devices or services.

BACKGROUND

Navigation systems are used by people and vehicles for routing and directions in order to travel between two locations. Navigation systems require accurate information to properly route vehicles. Identifying exactly where a vehicle is on the road in real time, along with its immediate surroundings, may eliminate many dangerous unknowns. Further, a comprehensive map is a crucial component of assisted or automatic driving. Vehicles may include many sensors, but a comprehensive map may be the most important tool vehicles use. Sensors in vehicles may be able to detect lanes and lane markings in real time using image processing and Lidar based systems. These systems are useful for obstacle avoidance and detecting the movements of other vehicles. When used alone though, on board sensor systems may exhibit large blind spots and may be unable to predict events or maneuvers even a short distance away, i.e. out of range of the vehicle's sensors.

On-board sensors, however, when combined with comprehensive maps may allow for assisted and highly automated vehicle operation. A comprehensive map and an associated geographic database may be made up of information or data observed in real-time or measurements gathered over time. The geographic database may include information about the represented geographic features, such as the positions of the roads, speed limits along portions of roads, address ranges along the road portions, turn restrictions at intersections of roads, direction restrictions, such as one-way streets, and so on. Information for the geographic database may be collected, sorted, and analyzed in order provide accurate estimations for the roadway.

SUMMARY

A method comprising receiving high beam data indicative of high beam use at a location and roadway conditions for the location. A processor calculates a high beam confidence value from the high beam data and the roadway conditions. The processor calculates a high beam frequency from the high beam confidence value. The processor augments a geographic database to include the high beam frequency.

A method comprising receiving high beam data indicative of high beam and ambient light data. A processor calculates a high beam frequency. The processor calculates an ambient light value. The processor generates a road illumination value for one or more road segments based on the high beam frequency and the ambient light value.

An apparatus comprising a processor, data storage, road segment data entities, and high beam data entities. The road segment data entities represent locations of a road network located in a geographic region. The high beam data entities represents high beam usage at a respective location.

BRIEF DESCRIPTION OF THE DRAWINGS

Exemplary embodiments of the present invention are described herein with reference to the following drawings.

FIGS. 9A and 9B illustrate examples of received ambient light data.

DETAILED DESCRIPTION

Figure 1:
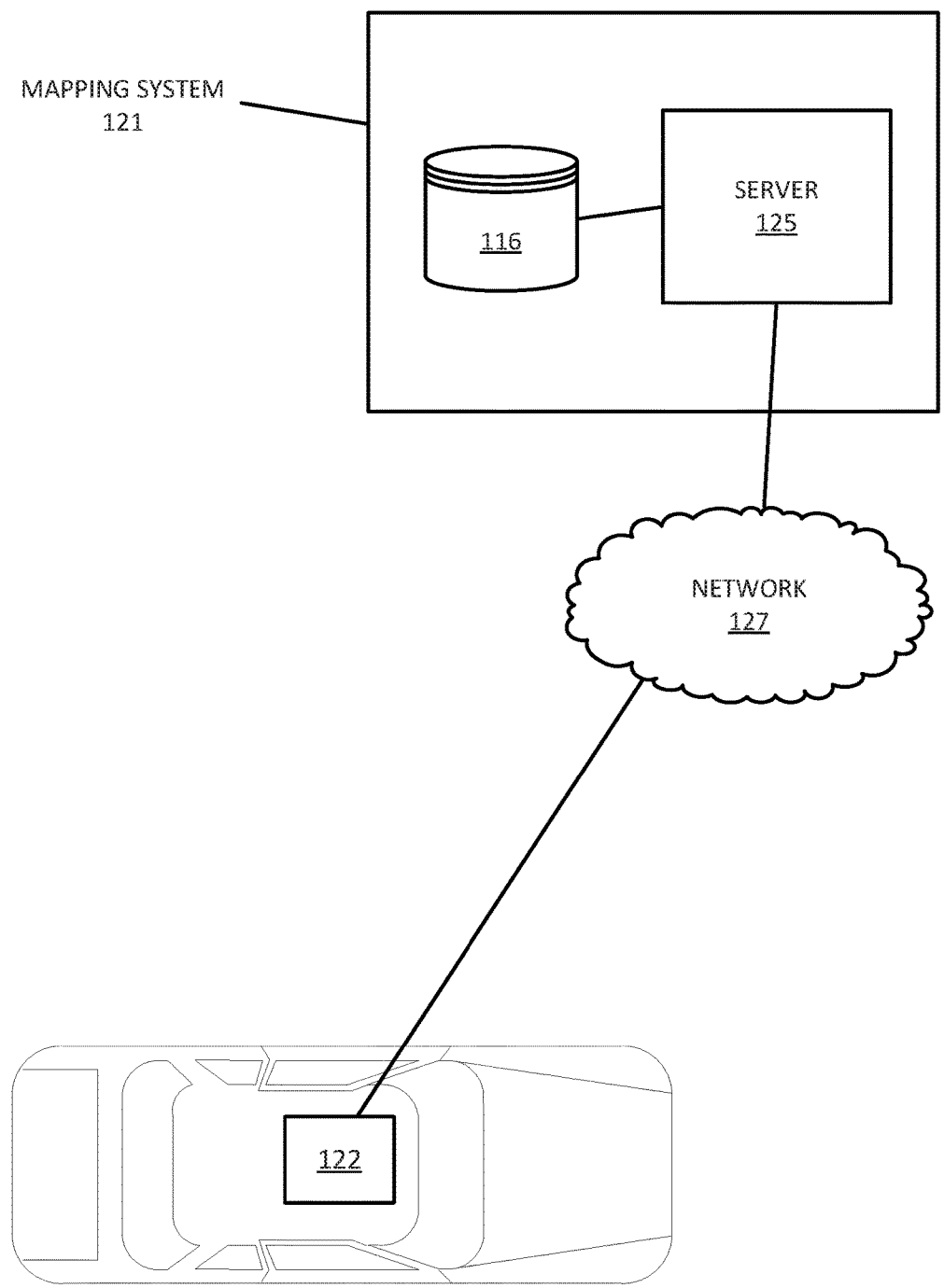
FIG. 1 illustrates an example system for mapping road illumination.

The following embodiments relate to systems and methods for collecting and analyzing data collected from vehicles to identify and map roadway illumination. As the collected data may include data not relevant to roadway illumination, other data coincident or contemporaneous with the collected data may be received to help distinguish or otherwise extract or separate the relevant data from the non-relevant data.

Roads may have different levels of natural and artificial illumination for nighttime vehicle operation. Certain roads or road segments may be lit poorer than other road and segments. The lack of illumination may be caused by random events or circumstances. For example, locations with poor illumination may be temporarily caused by weather, other vehicles, or obstructions. However, a main cause of poor illumination is the lack of artificial lighting, e.g. overhead lighting. Overhead or other artificial lighting that is common in city settings or populated areas may be sparse in rural or suburban areas. Identification of areas that are consistently under lit may be beneficial to promote safer vehicle operation. In the case of a traditional vehicle, a maximum safe driving speed may be limited by the range the driver can see. In the case of an autonomous vehicle, a maximum speed may be limited by the range of the vehicle sensors. Although sensor technologies such as radar and ultrasound may be unaffected by visible sight range, video cameras or other optical sensors may require adequate light to function. Video cameras are used for important tasks such as the detection of signs, identification of lane markers, etc. Identification of low illumination areas may improve both routing and real-time vehicle safety. One method for identification of low illumination areas is to identify when a vehicle operates with the brightest and/or longest range setting of the vehicle's headlights activated, referred to as the "brights" or "high beams".

Headlights operating on "upper" or on high beam allow a vehicle's operator to detect objects further out as high beam headlights provide brighter, more directed, long-range illumination as compared with low beam or normal headlights. In areas where adequate overhead illumination is not provided, high beams are often used. As such, manual and/or automatic high beam usage by a vehicle operating in those areas may indicate low illumination areas. High beam usage, however, is not only used for lack of illumination. Use of high beams may indicate other non-illumination events such as passing vehicles or weather related visibility. In order to use high beam data to identify low illumination areas, high beam events unrelated to illumination may be excluded.

Data related to ambient lighting may be collected indirectly, such as through determining headlight or high beam usage, or directly through ambient light sensors. Both types of data, indirect and direct, may include noise. The noise may be diminished, e.g. statistically, by analyzing the data using functions and additional data collected in conjunction with, and/or derived from, the high-beam usage data. The data, once analyzed and processed, may be used to generate or supplement/augment a geographic database, such as a geographic database comprising links and nodes with attributes indicating the estimated roadway illumination. The estimated roadway illumination may be used to generate routes, operate vehicles, or in combination with other information to allow for safer and more efficient operation on the roadways.

FIG. 1 illustrates an example system for identifying and mapping roadway illumination. The system includes one or more devices 122, a network 127, and a mapping system 121. The mapping system 121 may include a database 116 (also referred to as a geographic database or map database) and a server 125. Additional, different, or fewer components may be included.

The mapping system 121 may include multiple servers, workstations, databases, and other machines connected together and maintained by a map developer. The mapping system 121 may be configured to identify or estimate ambient light available on road segments at various times of the day, including at night. The mapping system may also be configured to generate routes or paths between two points (nodes) on a stored map. The mapping system 121 may be configured to provide up to date information and maps to external geographic databases or mapping applications. The mapping system 121 may be configured to encode or decode map or geographic data. The identified roadway illumination estimations may be stored by the mapping system 121 in the geographic database 116 as link, segment, or node attributes.

Figure 2:
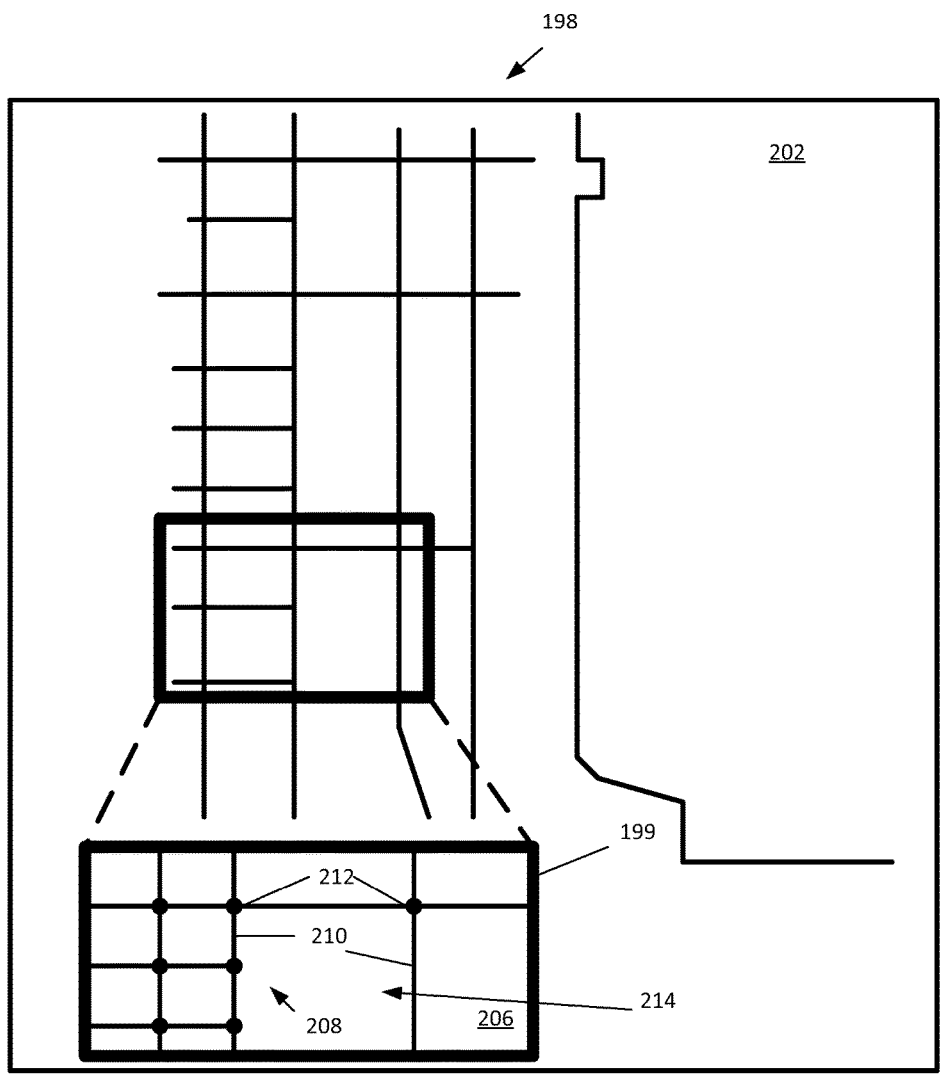
FIG. 2 illustrates a map of a geographic region.

In order to provide navigation-related features and functions to the end user, the mapping system 121 uses the geographic database 116. The geographic database 116 includes information about one or more geographic regions. FIG. 2 illustrates a map 198 of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 further depicts an enlarged map 199 of a portion 206 of the geographic region 202. The enlarged map 199 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead-ends.

Figure 3:
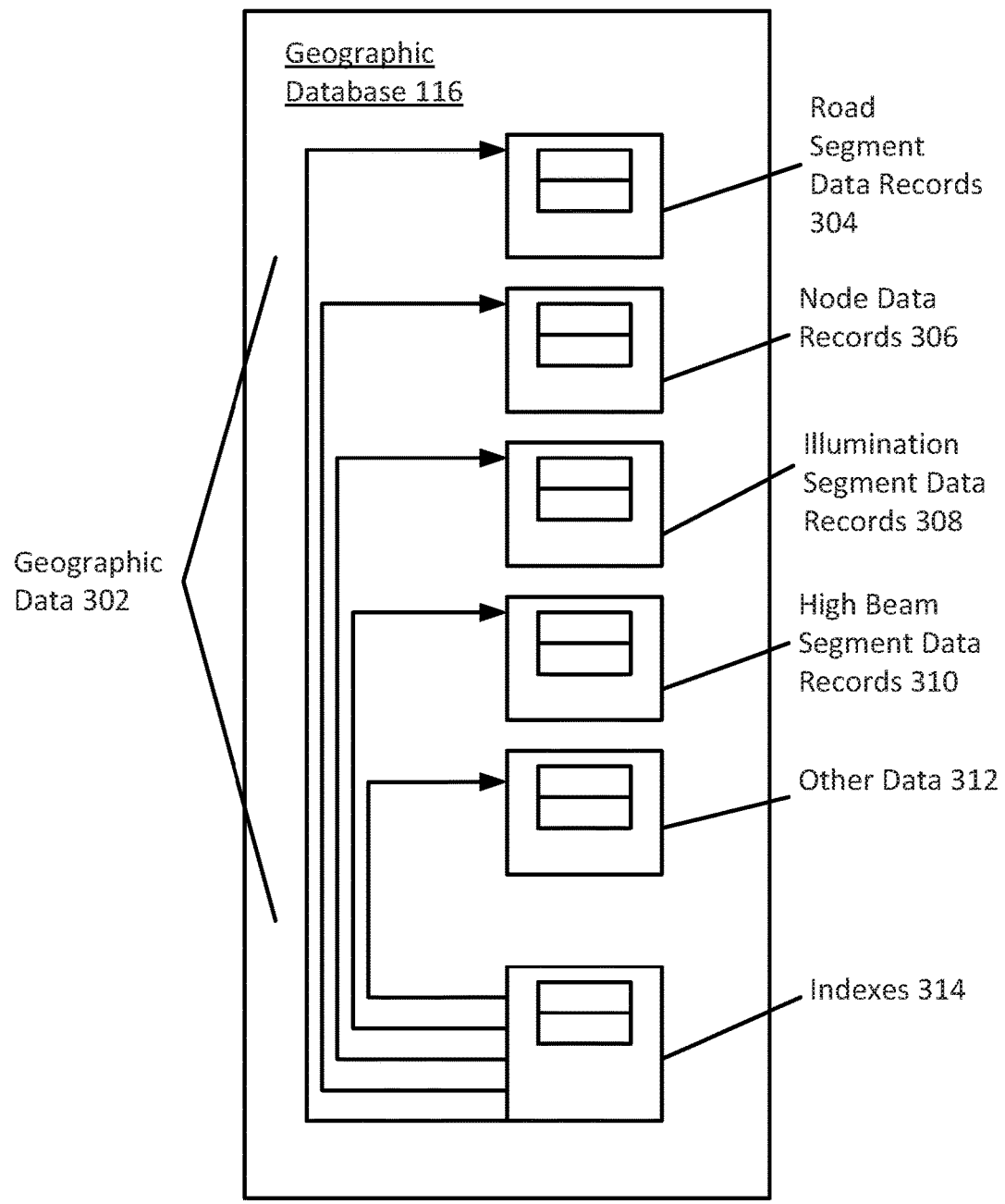
FIG. 3 illustrates a block diagram of a geographic database of FIG. 1.

Referring to FIG. 3, in one embodiment, the geographic database 116 contains data 302 that represents some of the physical geographic features in the geographic region 202 depicted in FIG. 2. The data 302 contained in the geographic database 116 may include data that represent the road network 208. In the embodiment of FIG. 3, the geographic database 116 that represents the geographic region 202 may contain at least one road segment database record 304 (also referred to as "entity" or "entry") for each road segment 210 in the geographic region 202. The geographic database 116 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 4:
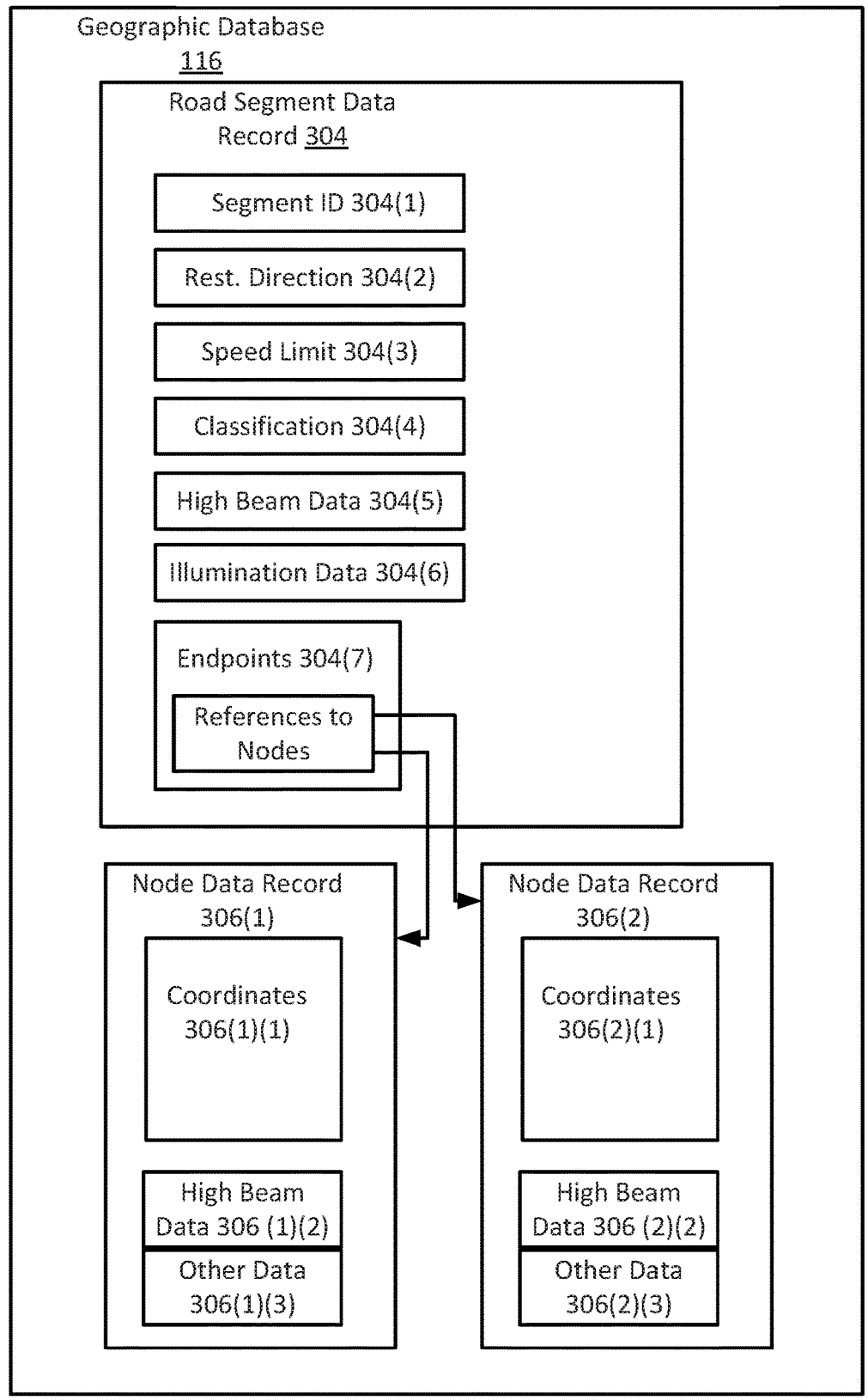
FIG. 4 illustrates a block diagram of components of data records contained in the geographic database of FIG. 3.

FIG. 4 shows some of the components of a road segment data record 304 contained in the geographic database 116 according to one embodiment. The road segment data record 304 may include a segment ID 304(1) by which the data record can be identified in the geographic database 116. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

Data for high beams, low beams, fog lights, other vehicle lighting and illumination may be stored as separate records 308, 310 or in road segment data records 304. The geographic database 116 may include road segment data records 304 (or data entities) that describe features such as high beams 304(5) or roadway illumination estimations 304(6).

The estimated roadway illumination may be stored as a field or record using a scale of values such as from 1 to 100 (1 being dark, 100 being fully lit) or based on a measurement scale such as lux or illuminance, or range thereof. The estimated roadway illumination may be stored using categories such as low, medium, high. The estimated roadway illumination may be stored as a variable related to visibility. For example, a well-lit road may have visibility up to 1000 feet or more. A medium lit road may have visibility of 500 feet to 1000 feet and a low visibility road may have visibility less than 500 feet. With high beams, a normal observer may see from about 350-500 feet depending on the conditions. A low illumination roadway may indicate visibility below what would normally be a safe stopping distance. Additional schema may be used to describe the estimated roadway illumination. The geographic database 116 may store other data 312 relating to illumination such as high beam data, headlight data, or actual ambient light readings. The attribute data may be stored in relation to a link/segment 304, a node 306, a strand of links, an area, or a region. The geographic database 116 may store information or settings for display preferences. The geographic database 116 may be coupled to a display. The display may be configured to display the roadway network and data entities using different colors or schemes. The geographic database 116 may store information relating to where hazardous conditions may exist, for example, though analysis of the data records and current/historical traffic conditions. Road segments with low illumination may be used to identify or supplement other data entities such as potential hazards. High beam usage data records along with geographic data records may indicate through a combination of conditions that location on a roadway is not safe.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 4 also shows some of the components of a node data record 306 which may be contained in the geographic database 116. Each of the node data records 306 may have associated information (such as "attributes", "fields", etc.) that allows identification of the road segment(s) that connect to it and/or it's geographic position (e.g., its latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The geographic database 116 may be maintained by a content provider (e.g., a map developer). By way of example, the map developer may collect geographic data to generate and enhance the geographic database 116. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The database 116 is connected to the server 125.

The geographic database 116 and the data stored within the geographic database 116 may be licensed or delivered on-demand. Other navigational services or traffic server providers may access the traffic data and the estimated roadway illumination data stored in the geographic database 116. Data including the estimated roadway illumination data for a link may be broadcast as a service.

The server 125 may be a host for a website or web service such as a mapping service and/or a navigation service. The mapping service may provide maps generated from the geographic data of the database 116, and the navigation service may generate routing or other directions from the geographic data of the database 116. The mapping service may also provide information generated from attribute data included in the database 116. The server 125 may also provide historical, future, recent or current traffic conditions for the links, segments, paths, or routes using historical, recent, or real time collected data. The server 125 may be configured to analyze collected ambient light data or high beam data to determine an estimated roadway illumination for segments or links. The server 125 may be configured to analyze data from segments and links to determine correlations between similar types of segments and nodes. For example, segments with similar high beam use may have similar accident profiles or traffic patterns.

The server 125 is connected to the network 127. The server 125 may receive or transmit data through the network 127. The server 125 may also transmit paths, routes, or estimated roadway illumination data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The one or more devices 122 may include probe devices, probe sensors, or other devices 122 such as personal navigation devices 122 or connected vehicles. The server 125 may communicate with the devices 122 through the network 127. The server 125 may also receive data from one or more systems or services that may be used to predict roadway illumination. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may also be integrated in or with a vehicle. The devices 122 may be configured to collect and transmit data including headlight and high beam usage. The devices 122 may be configured to collect and transmit data including data from light sensors on or about a vehicle.

Sensor data may be collected with a light sensor, or collection of sensors, such as an optical detector (e.g., camera, light detection and ranging (LiDAR), or radar device). The devices 122 and/or other sensor(s) may report the quantity, frequency, and/or speed of vehicles as the devices 122 travel roadways. The devices 122 and/or other sensor(s) may report the level, frequency, and variances of illumination as the devices 122 travel roadways. The road segment or link may be determined based on the geographical coordinates of the probe (e.g., global positioning system (GPS)).

Figure 5:
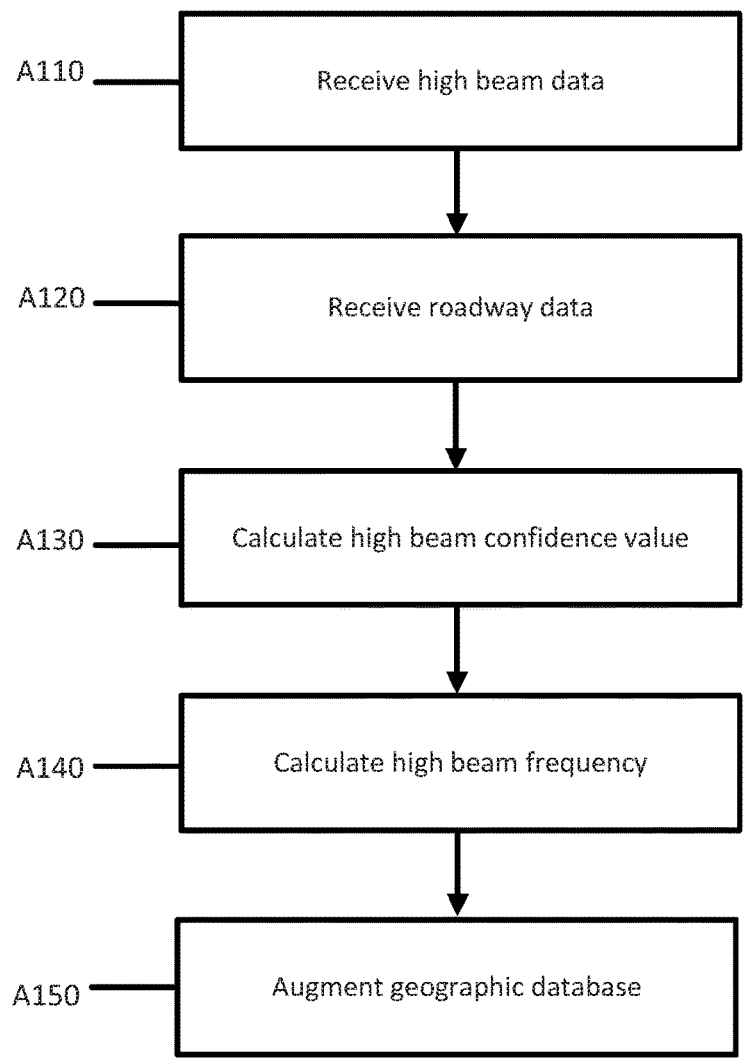
FIG. 5 illustrates an example flowchart for mapping road illumination.

FIG. 5 illustrates an example flow chart for mapping road illumination. As presented in the following sections, the acts may be performed using any combination of the components indicated in FIG. 1, FIG. 7, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the server 125 receives high beam data. High beam data may be received over the network. High beam data may be collected by a device 122 during operation of a vehicle. A device coupled with the vehicle may detect activation of the high beam switch or a sensor not directly connected but which detects the increase in brightness of the headlights when the high beams are turned on. High beam data may be collected and transmitted, e.g. wirelessly, in real time and/or may be stored locally in the device 122 and transmitted at a later time to the server 125. In situations where there is connectivity, the high beam data may be relayed in real time but when connectivity drops, the device may store data until such time as connectivity is reestablished. High beam data may include data related to a high beam event such as time active, duration, and location data (which may be provided by a navigation system).

High beams are typically used on highways and rural roads without much traffic. High beams may be turned off if there is on-coming traffic or a vehicle directly ahead. High beams may be operated manually by the operator of a vehicle or automatically though usage of automatic high beam systems. High beam data may be received as an ON or OFF state for a specific time and location. For vehicles with more complex headlight systems, additional data may be received such as level of brightness or direction. As high beams may be turned off or on frequently, multiple ON and OFF states may exist for a particular road segment. Data may be stored for both the ON or OFF states.

Figure 6:
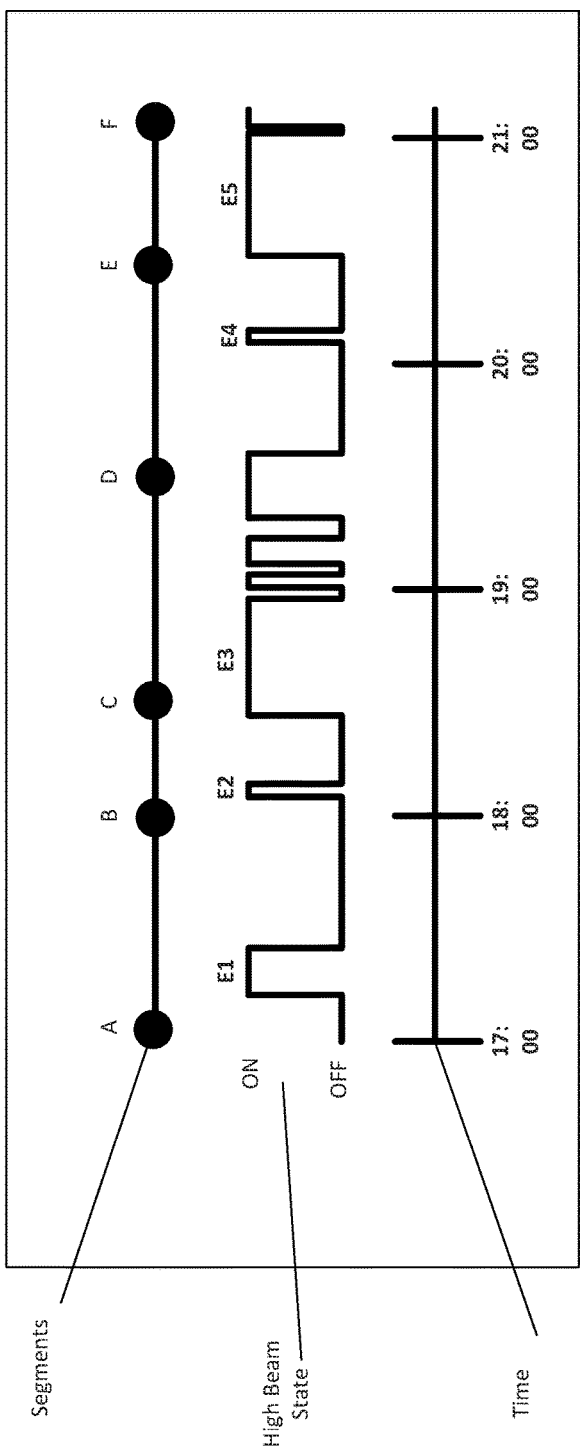
FIG. 6 illustrates example high beam data.

FIG. 6 illustrates high beam data received over a period of time while a vehicle has traveled from point A to F. Two states for the high beam data exist (ON and OFF). As shown, the high beams are switched on at various time for different periods of time covering different road segments. For example, the high beams are in the ON state at around 18:20 when the vehicle begins to traverse the C to D segment. The high beams are momentarily turned to the OFF State at 18:55 then turned back ON again at 19:00. A high beam event starts when the high beams are moved to the ON state and ends when the high beams are turned OFF. Events may be bifurcated when a vehicle travels from one segment to another. For example, an event that straddles the D node may be split into two separate events; one event before D, one event after D.

In certain embodiments, high beam data may only be received during non-daylight hours or when ambient light levels fall below a certain level. High beam usage during the day may not be useful as daylight high beam usage may not relate to roadway illumination. Exceptions may exist for tunnels, heavily wooded areas, and long overpasses, among others. Daylight hours may include dawn and dusk, e.g. 30 minutes before sunrise and after sunset. Sunrise and sunset may be determined through use of a table and geographical location. Roadway location may also be used to determine daylight hours. For example, a roadway in a valley may become darker sooner than one without any obstructions. For road segments that are well travelled, high beam data may only be collected at the peak of night, e.g. the two darkest hours. Moon phases may also be used to determine when high beam data is collected. Data collected during a full moon or closer to sunrise and sunset may include more light contamination and may not be indicative of normal illumination.

In certain embodiments, the server 125 may receive additional data such as low beam data, fog light data, or headlight data from automatic or adaptive headlights. Headlights may be used manually or automatically. Manual headlights require an operator to turn on or off the headlights or adjust brightness. Automatic headlights such as daytime running lights may be turned on and off in response to vehicle operation or light sensors. Automatic headlights may be activated through a photoelectric sensor. The sensitivity of the sensor may be set by the auto manufacturer or the operator. The sensor may be activated by the lighting conditions such as at dawn or dusk. Some vehicles may also have a light sensor that informs the vehicle if the exterior is dark (e.g. night or in a tunnel). When the switches in the vehicle are set for automatic headlights, the vehicle will turn on the lights whenever the sensor senses that the exterior is dark enough.

Automatic headlights may also detect nearby light sources such as the headlights or tail lights of vehicles ahead. The system may automatically switch between high beams and low beams to ensure optimum nighttime visibility. High beams may be automatically activated when the following conditions are met: the vehicle speed meets a threshold speed, for example fifteen miles per hour or more; the area in front of vehicle is dark; no oncoming headlights; no tail lights in front of vehicle; no strong lighting, from street lights, etc., ahead of vehicle. Automatic headlights may also be controlled by data received from a geographic database 116 including road illumination data. For example, automatic headlights may be limited to road segments that have poor or low ambient lighting.

When receiving high beam data, the server 125 may not differentiate between manual or automatic high beam events. However, the server 125 may collect the data that initiates the automatic high beams to determine if the high beam event is valid (e.g. speed and light sensor data). In vehicles where automatic high beams are turned off, the server 125 may still receive data that the high beams would have been turned on had the option not been disabled. For vehicles that do not have automatic high beams, the server 125 may likewise receive a notification that the conditions exist (speed and light sensor data) that would prompt a high beam event. The server 125 may store OFF data as well as ON data. The lack of high beam usage may be indicative of adequate lighting.

Other advanced systems such as adaptive headlights may illuminate around corners by aiming the beam in the direction an operator has turned the steering wheel. Adaptive headlights may use mechanical systems or electronic systems. In certain situations, if the speed of a vehicle is increased, the lights are raised automatically to provide more visibility. If the vehicle slows down, signals, or comes upon traffic in the opposite lane, the light beams may be automatically lowered. Adaptive headlights may also include an auto-off setting to help prevent the vehicle from "blinding" fellow drivers or leaving the lights on. When the vehicle is parked or idling with the wheel cranked toward the road, the lights may be turned off to protect other drivers.

Manual, automatic, and adaptive headlights (low or high beam) may generate data that is collected by a device 122. Further data, such as use of fog lights, low beam usage during daylight (or nighttime) hours or other vehicle lighting data may be generated and collected. Fog lights, for example, throw out a low, wide beam which cuts below the fog to help you see where the edges of the road are. Fog lights may be turned on automatically or manually. Fog lights may be rear or front facing. Additional data, such as the sensor data (light, speed, direction) that determines how the automatic and adaptive headlights work may also be collected. This data may be received either in act A110 or act A120 below. The server 125 may receive all of this data either in real time or the data may be stored locally until transmission is possible or efficient.

At act A120, the server 125 receives roadway condition data. Roadway conditions may include additional data collected by vehicle sensors or the device 122. Roadway conditions may also include data received from a traffic management center or other service. Roadway data may include traffic or weather data.

The roadway data may be existing data regarding the physical structure or layout of a location or road segment. For example, a geographic database 116 may contain data for each segment including such aspects as number of lanes, road width, road curvature, grade, barriers, and speed limit, among others.

Traffic data may include data relating to other vehicles. Traffic data may include traffic volume, traffic flow, average speed, accidents, among others. Traffic data may be collected by the device 122 or received from a traffic management center. Weather data may include local weather conditions such as precipitation, cloud cover, and expected visibility among others. Weather data may be collected from the vehicle or from a weather center.

At act A130, the server 125 calculates a high beam confidence value based on the high beam data and the roadway conditions. The high beam confidence value may indicate a level of confidence that the high beam event occurred in response to low levels of roadway illumination. False positives, or events where a high beam event is detected but the high beams are not intended for low levels of light, may be considered noise for determining low roadway illumination. For example, some drivers may use a flash feature on a high beam control arm to alert a driver traveling too slowly in the passing lane. Drivers may also forget to turn off high beams even when no longer needed, such as transitioning from a rural area to a well-lit street in town. Drivers may use high beams during certain types of weather. Drivers may also accidentally turn on high beams. Each of the events may need to be excluded or discounted to accurately determine roadway illumination. Such events may be seen in the example data from FIG. 6 described above. The first event (E1) in FIG. 6 takes place prior to sunset (in this example). As such, this event is most likely not going to be useful. The second event (E2) is a very short duration. This is most likely a driver attempting to alert a fellow driver. The fourth event (E4) is similar and potentially an attempt to alert a fellow driver.

A high beam confidence value may be calculated using the high beam data and the roadway conditions. The confidence value may be numerical or encompass varying levels or categories. The value may be compared against a confidence threshold in order to exclude data that is not considered useful to determine roadway illumination. Table 1 lists several different high beam events and associated roadway data (for the time and location). For these examples, each event occurs at night (daytime events have been pre-culled from the dataset). Additional data from the data shown may be used to determine a high beam confidence value. A high beam event may include the high beams being in the ON state. Events may be bifurcated when a vehicle transitions from a first segment to a second segment. The first event ends at the node between segments, the second event starts at the node.

TABLE 1

| Event Id | Segment | Duration (sec) | Type of Road | Weather | Traffic Volume | Speed (mph) |
|---|---|---|---|---|---|---|
| A | 10001 | 4 | City | Clear | Heavy | 20 |
| B | 10002 | 45 | Rural | Clear | medium | 45 |
| C | 10002 | 24 | Rural | Clear | medium | 45 |
| D | 10002 | 22 | Rural | Clear | medium | 45 |
| E | 10003 | 134 | Rural | Rain | light | 35 |
| F | 10003 | 256 | Rural | Rain | light | 35 |
| G | 10006 | 2 | Rural | Fog | light | 22 |
| H | 10006 | 72 | Rural | Clear | light | 55 |
| I | 10009 | 2 | City | Clear | medium | 45 |
| J | 10013 | 678 | Rural | Snow | light | 12 |
| K | 10013 | 897 | Rural | Snow | light | 2 |

For this example, there are three categories for to place data into: Low probability, medium probability, and high probability. Each category represents the likelihood that data is useful for determining roadway illumination or high beam frequency. Low probability events may be discounted compared to high probability events when aggregating multiple events. In certain embodiments, there may be additional categories depending on the amount and granularity of data. For example, with additional data, the server 125 may be able to perform a more complex sorting.

Event ID (A) takes place on segment 10001 and lasts for 4 seconds. The road type is city, there are no weather conditions, and the traffic volume is heavy. The vehicle is traveling at approx. 20 mph. The server 125 may interpret the short duration as indicating a low probability event. Likewise for the type of road and traffic volume. Both indicators suggest that the high beam event would be unlikely to be useful for determining roadway illumination. This event possibly indicates a driver signaling to a different vehicle.

Event ID's (B), (C), and (D) all take place on segment 10002. The durations 45 s, 24 s, and 22 s all are indicators that this may be a high probability event. Likewise, the setting (rural), the traffic volume (medium), and the average speed indicate that the events were likely to be useful for determining roadway illumination. Additional information, such as the time between events or the total time for the vehicle to traverse the segment may be beneficial to the determination.

Event ID's (E) and (F) involve long durations on rural roads. Both are high probability events. Event ID (I) is a low probability event due to the duration and location.

Event ID's (G) and (H) both take place on segment 10006. (G) is of a short duration, while (H) is much longer. Because (G) is short, (G) would normally indicate a low probability event. (H) as a long duration event on a rural road may indicate a high probability event. (G) as a low probability event may not be used to determine the roadway illumination.

Event ID's (J) and (K) both are long duration events that take place in rural areas. However due to the weather (snow) and speed (slow), both event are suspect. One possibility is that due to the weather conditions and visibility, the driver was using high beams to make up for the failure of the overhead lighting to illuminate the roadway. Both (J) and (K) may be determined to be medium probability events.

At act A140, the server 125 calculates a high beam frequency for a segment. The server 125 may aggregate a plurality of high beam confidence values to determine a frequency estimate. The server 125 may further calculate a roadway illumination value from the high beam frequency or the high beam confidence values. For each segment there may exist one or more high beam confidence values covering a specific time. For example, for segment 10002 in Table 1 shown above there are three events. Each time the high beams are in the ON position may be considered a separate event. Each event may have a high beam attribute calculated above at act 130. For segment 10002, the three events are all high probability events. The server 125 may determine from the three events that there is a high likelihood that there is high beam usage and low illumination for the segment 10002. The server 125 may aggregate multiple events from different sources. For example, certain operators may be more or less likely to use high beams. Data from one vehicle may be very useful and as such weighted higher, whereas lower value data (even though it is deemed positive) may be grouped together and weighted less. Low probability events may be used to determine a road illumination estimate; however, low probability events may be weighted lower or discounted compared to high probability events.

In certain embodiments, the ON high beam events may be aggregated first by the source of the events. The reports for a vehicle may first be grouped together to ascertain the condition of a road segment at a particular time. Reports for the same types of vehicles may be aggregated together (sports cars/trucks/buses/mini vans/sedans etc.) Reports for similar traffic conditions or weather conditions may aggregated together. Reports from the same time period may be aggregated together. In the example described above, all three events from segment 10002 may be aggregated together prior to being combined with other data from other devices.

Once the server 125 has aggregated and sorted each event, the server 125 may determine an estimation of road illumination. The server 125 may use the volume of traffic for a segment to more accurately calculate road illumination. For example, the number of high probability events is a direct indictor of road illumination. A high number would indicate low illumination, and vice versa. However, on a rural road with very little traffic (particularly during night time hours) there may only be a few events compared to a medium traffic highway. A high traffic highway may see a decrease in high beam events due to the number of cars and potentially slower speeds. The number of events may be compared to the volume of traffic for a roadway, an area, or a region.

At act A150, the server 125 generates or augments a geographic database 116. The geographic database 116 may include link and node data with associated attributes such as the estimated roadway illumination data. The geographic database 116 may also contain the high beam attributes and the raw high beam data. The generated or augmented geographic database 116 may be part of a larger geographic database 116 as described above. The geographic database 116 may be used to generate or display a visual map of an area or region. Different colors or indicators may be used to indicate the levels of roadway illumination for a particular segment. The geographic database 116 may be used in a layering application, wherein a user may toggle on or off the roadway illumination estimation data.

The server 125 may generate a route using the high beam data in the geographic database 116 or display high beam usage or roadway illumination. The server 125 may publish high beam usage or roadway illumination using a traffic management channel (TMC), or through intelligent transportation systems (ITS), or other broadcast system or schema. The geographic database 116 may be used with real-time data to estimate local conditions and to generate operating instructions or suggestions for a vehicle. For example, the server 125 may receive a request for a well illuminated route. A request may contain a threshold illumination. A request may include a visibility threshold. The server 125 may calculate visibility for a road segment based on the roadway conditions, weather conditions, and/or an estimated road illumination. The server 125 may generate multiple routes including different options for both time, types of road segments, and illumination. One route may be limited to only using road segments that have a high likelihood of being well lit. Another route may additionally use road segments that have a medium likelihood of being well lit. Each route may also be generated with current or expected traffic conditions to give an estimated time of arrival. The route may be transmitted to a device 122. The route may be displayed using a geographic database 116.

Figure 7:
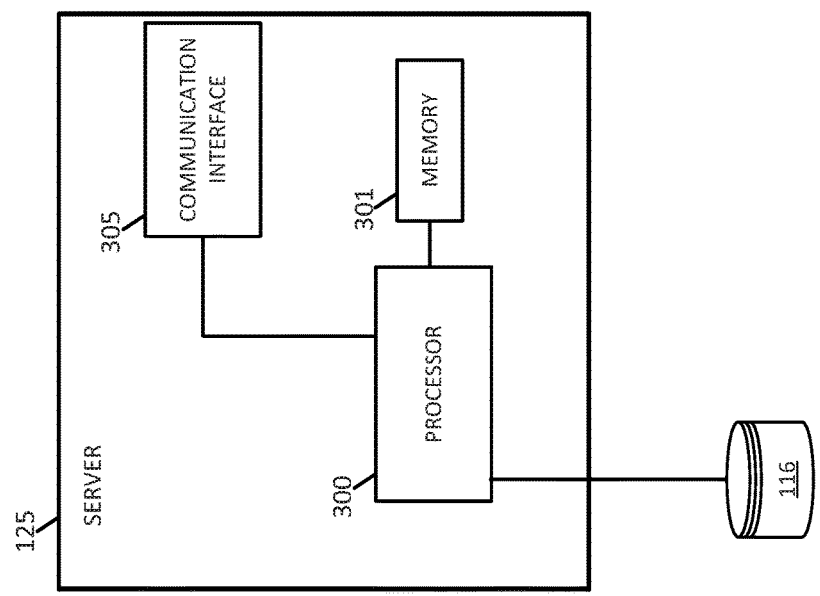
FIG. 7 illustrates an example server of the system of FIG. 1.

FIG. 7 illustrates an example server 125 of the system of FIG. 1. The server 125 includes a processor 300 that is connected to a communications interface 305 and a memory 301. The processor 300 is also connected to the database 116. The communications interface 305 is configured to receive headlight data from one or more probes or devices 122. The memory 301 is configured to store received real-time and historical data. The processor is configured to estimate roadway illumination levels for a road segment. The processor may be configured to generate maps and routing instructions. Additional, different, or fewer components may be included.

Figure 8:
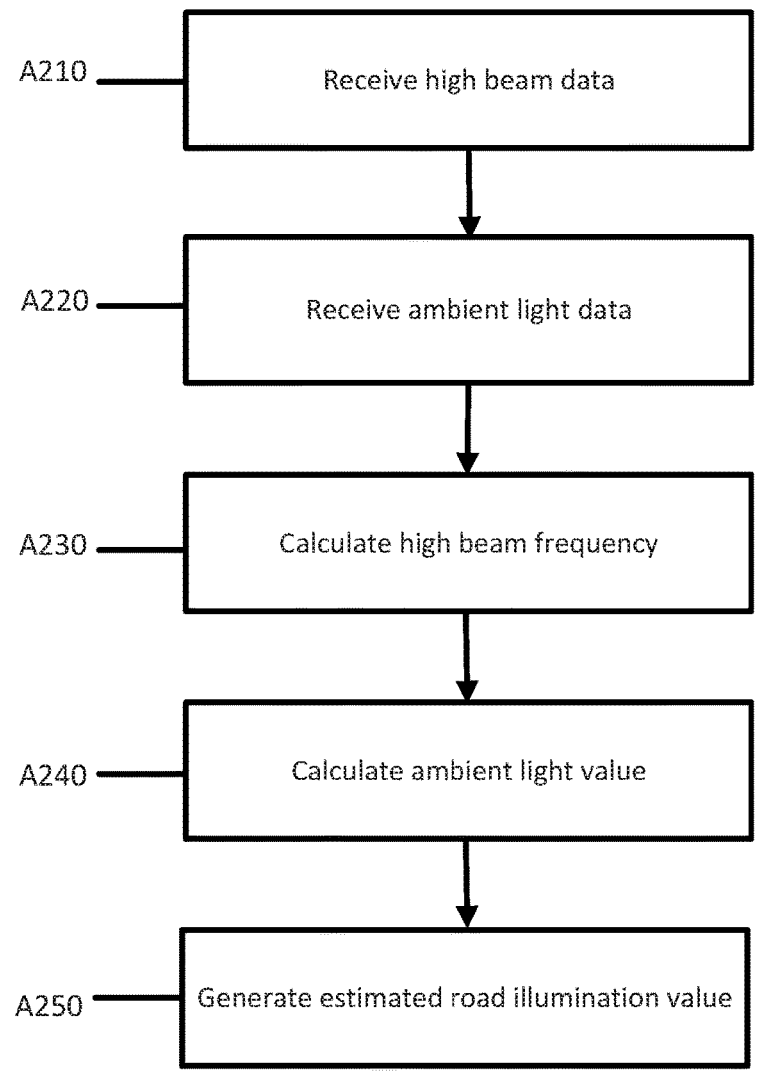
FIG. 8 illustrates an example workflow for estimating roadway illumination using the server of FIG. 7.

FIG. 8 illustrates an example workflow for estimating roadway illumination using the server 125 of FIG. 7. As presented in the following sections, the acts may be performed using any combination of the components indicated in FIG. 1, FIG. 7, or FIG. 10. The following acts may be performed by the server 125, the device 122, or a combination thereof. Additional, different, or fewer acts may be provided. The acts are performed in the order shown or other orders. The acts may also be repeated.

At act A210, the server 125 receives information from a device 122 about headlight settings, in particular a driver's use of high beams. The high beam data may include both the state of the high beams (ON/OFF), a location, and a time. The server 125 may receive high beam data that indicates an ON state and a duration of the ON state. The server 125 may receive additional information from the device 122 related to the headlight settings. Headlight systems such as automatic or adaptive systems may report additional information that may be transmitted to the server 125 though the communications interface. For example, if the operator overrode the operation of an automated high beam system. The communication interface 205 and/or communication interface 305 may include any operable connection. An operable connection may be one in which signals, physical communications, and/or logical communications may be sent and/or received.

An operable connection may include a physical interface, an electrical interface, and/or a data interface. The communication interface 205 and/or communication interface 805 provides for wireless and/or wired communications in any now known or later developed format.

At act A220, the server 125 receives ambient light data. Ambient light sensors may directly measure the amount of light at a time and location. Ambient light sensors may be similar to the sensors used to enable automatic headlights. The light data from ambient light sensors may pick up not only overhead lighting but also other sources such as passing vehicles or onetime events.

At act A230, the server 125 calculates a high beam frequency for one or more road segments based on the high beam data. The server 125 may aggregate multiple high beam events for each segment to determine a high beam frequency. The high beam frequency may be calculated by determining how often high beams are used compared to traffic volumes on the road segment. Due to noise, having multiple sets of data from multiple vehicles at different time, may assist in excluding high beam data that is not useful.

At act A240, the server 125 calculates an ambient light value for the one or more road segments based on the ambient light data. FIGS. 9A and 9B illustrates two examples received of ambient light levels. FIG. 9A illustrates the signal from the ambient road lighting. For roads with overhead lighting, the effective ambient lighting will be reasonably uniform, and fluctuations will have a fairly long period as a function of the car's position. For example, in FIG. 9A as the vehicle moves away from a first overhead light 710, the ambient light gradually diminishes until the vehicle is midway between overhead lights. As the vehicle moves towards the second overhead light 715, the ambient light gradually increases until the vehicle is at the closest point to the second overhead light 715. This pattern of gradually increasing and decreasing may be evident even when the overhead lighting is not equally spaced.

FIG. 9B illustrates expected ambient light readings from a vehicle 720 passing in the opposite direction. The signal from the sensor will rise much more quickly (See 730 and the slope of the rise) than the example shown in FIG. 9A above. Once the vehicle has passed the sensors, the ambient light drops sharply (See 740 where the ambient light falls off quickly). The server 125 may use Fourier analysis to separate the high and low frequency components in order to determine patterns. Additional sources of ambient light may be detected by the sensors. For example, other roadside sources such as businesses or houses may affect the collection of overhead lighting. Other transient/temporary illumination source such as from a bicycle, portable lights, overhead helicopter, lighted signs, or flares, among others may also be detected and excluded. Lighting from behind the vehicle, may not be an issue as the ambient light sensor is typically mounted towards the front of the vehicle and as such other vehicles driving behind our vehicle will not be a large source of contamination. For a given segment of road, the server 125 may require that there be data from multiple vehicles so that the server 125 may form a distribution of ambient light values. The data from the vehicles may be collected at the same time or different times including different days. The data may be grouped together with similar data (day of the week, time of day, seasonality, weather conditions). The data may further be grouped by types of vehicles, driver data (possibly derived from insurance information or a driving record). The minimum value of the distribution may then be associated with the true ambient light, while higher values would likely be due to contamination from other nearby vehicles and sources.

At act A250, the server 125 generates an estimated road illumination value for the one or more road segments based on the high beam frequency and the ambient light value. Table 2 shown below illustrates a matrix of light sensor readings (ambient light value) and high beam frequency. From the data values, the server 125 may calculate an estimated road illumination value and a confidence in the estimate.

TABLE 2

| Light sensor reading | High beam use frequency | Estimated road illumination level | Confidence in estimate |
| --- | --- | --- | --- |
| Low | Never | Low | Low |
| Medium | Never | Medium | Medium |
| High | Never | Good | High |
| Low | Sometimes | Low | High |
| Medium | Sometimes | Low | Medium |
| High | Sometimes | Medium | Low |
| Low | Often | Low | High |
| Medium | Often | Low | Medium |
| High | Often | Medium | Low |

Most roads with overhead lighting will be represented by the dataset including high light sensor readings and high beam use frequency of never. The illumination for the roads may be estimated to be good. Likewise rural roads without overhead lighting will may be represented by the row containing low light sensor readings and a high beam use frequency of often. Certain combinations such as (Low|Never) (High|Sometimes) and (High|Often) are unlikely to occur.

The server 125 may further generate, augment, or supplement a geographic database 116 with the estimated road illumination level. The server 125 may publish the estimated road illumination level over a network or on a computer readable medium. The estimated road illumination level may be stored in memory as a record or attribute for each segment. The light sensor reading and the high beam use frequency may further be stored as attributes. The geographic database 116 may be used in route generation or as a mapping service. Route generation may be informed by the estimated road illumination attribute. For example, routes may be generated to avoid poorly lit area. The geographic database 116 may be transmitted or downloaded to a device 122.

The estimated road illumination and confidence values may be correlated with other information or attributes in the geographic database 116. For example, high beam usage on road segments may correlate with high incident (or accident) segments. Low beam usage during daytime hours may indicate low illumination conditions. Fog lights may indicate weather conditions. Additionally, the lack of usage for headlights (low or high) may be correlated with other information. The correlation of use or non-use may be used to inform drivers or autonomous vehicles to either avoid the segments or to be aware of the increased risks.

The estimated road illumination and confidence values may be used to automatically control headlight settings. Automatic headlights may require several prerequisites to determine when to turn on or off. The estimated road illumination attributes may be used as an input in determining when to automatically turn on or turn off (or increase/decrease brightness) the headlights or high beams. The estimated road illumination attribute may also provide notifications to manually operated vehicles or autonomous vehicles. For a manually operated vehicle, when the vehicle enters a low lit segment, an alert may be generated to inform the driver that high beams may be needed. An alert may be provided though visually or audio stimulation. For an autonomous vehicle, when the vehicle enters a low lit segment, the system may require the vehicle to switch from autonomous to manual. The system may further set a lower speed for the vehicle.

Figure 10:
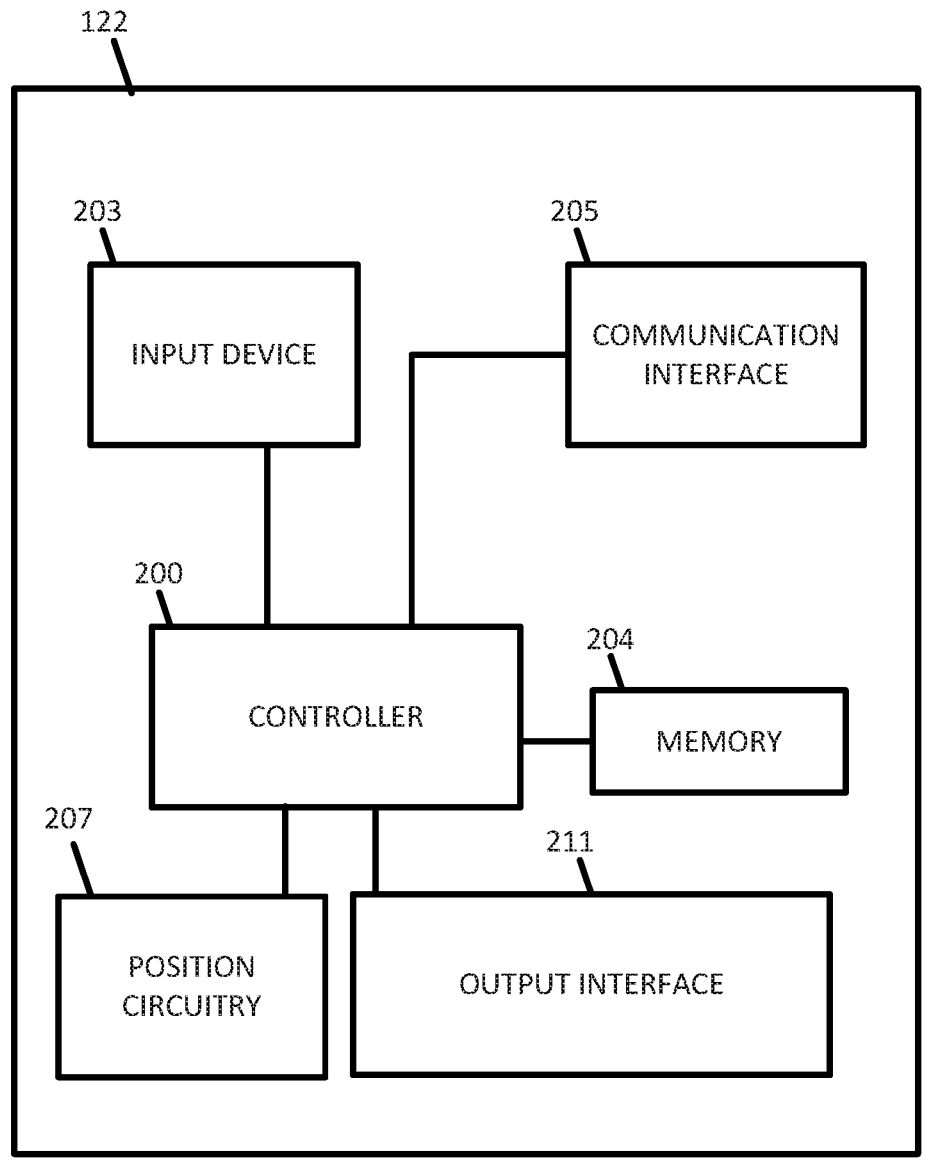
FIG. 10 illustrates an example device of the system of FIG. 1.

FIG. 10 illustrates an example device 122 of the system of FIG. 1. The device 122 may be configured to collect, transmit, receive, process, or display data. The device 122 may also be referred to as a probe 122, a mobile device 122 or a navigation device 122. The navigation device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

The device 122 may be configured to execute routing algorithms using a geographic database 116 to determine an optimum route to travel along a road network from an origin location to a destination location in a geographic region. Using input from an end user, the device 122 examines potential routes between the origin location and the destination location to determine the optimum route in light of user preferences or parameters. The device 122 may then provide the end user with information about the optimum route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on.

The navigation device 122 is configured to identify a starting location and a destination. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

The starting location (such as a current location) may be identified using positional circuitry such as GPS or other positional inputs. The positioning circuitry 207, which is an example of a positioning system, is configured to determine a geographic position of the navigation device 122. The movement circuitry 208, which is an example a movement tracking system, is configured to determine movement of a navigation device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203.

The navigation device 122 may identify its position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The navigation device 122 is further configured to request a route from the starting location to the destination. The navigation device 122 may further request preferences for the route including road illumination levels. The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver/transmitter for digital radio signals or other broadcast mediums. A receiver/transmitter may be externally located from the device 122 such as in or on a vehicle.

The navigation device 122 is configured to receive the route. The route may be generated from a geographic database 116. The route may include road illumination estimates in the form of attributes for road segments, links, or nodes. Depending on the preferences and the request, the route may only contain segments that meet a threshold for illumination. The route may include notifications for segments that are not well lit. The route may include notifications for areas or segment that have frequent high beam usage.

The route may be displayed using the output interface 211. The route may be displayed for example as a top down view or as an isometric projection. Road segments may be colored or shaded differently depending on the road segment's estimated illumination. For example, a well-lit roadway may be highlighted in yellow, while a low lit side road may be a shade of grey. While relative and/or subject terminology may be used throughout to describe levels of illumination, it will be appreciated that the use of such terminology is for convenience and that one of ordinary skill in the art would appreciate that the adequacy of illumination is dependent on the application or implementation of a device dependent thereon, such as light sensitivity, and that what may be considered "well lit" for one application may be poorly lit for another. However, in all such situations the disclosed embodiments may be utilized to objectively map illumination levels at various areas in a manner which may then be evaluated and utilized based on the intended application. The navigation device may store both the route and data for the surrounding area in a local memory.

The route may be generated with additional information from a geographic database 116. Routes for pedestrians or cyclists (who may prefer well-lit roads for safety reasons), may be generated specifically for those modes of transportation. Pedestrian routes may further be limited to well trafficked, well-lit roadways. Cyclists may prefer low traffic, well-lit roadways.

The memory 204 and/or memory 801 may be a volatile memory or a non-volatile memory. The memory 204 and/or memory 801 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card. The memory may contain a locally stored geographic database or link node routing graph. The locally stored geographic database may be a copy of the geographic database or may include a smaller piece. The locally stored geographic database may use the same formatting and scheme as the geographic database. The navigation device 122 may determine a route or path from a received or locally geographic database using the controller 200. The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing. The controller 200 may also include a decoder used to decode roadway messages and roadway locations.

The estimated road illumination may be used to directly or indirectly navigate a vehicle. The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the link and node information provided to the navigation device 122.

As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road. For an autonomous vehicle, the maximum speed may be limited by the range of the vehicle sensors. Although sensor technologies such as radar and ultrasound are unaffected by visible sight range, video cameras require adequate light to function. Video cameras are used for important tasks such as the detection of Stop signs.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for providing navigation services, the method comprising:
    collecting high beam data by a first sensor for a road segment;
    collecting roadway condition data by a second sensor for the road segment;
    generating a data message including the high beam data and the roadway condition data for the road segment; and
    transmitting the data message to a navigation service provider.

2. The method of claim 1, wherein the roadway condition data comprises at least ambient light data.

3. The method of claim 1, wherein the roadway condition data comprises at least weather data for the road segment.

4. The method of claim 1, wherein the roadway condition data comprises at least traffic data.

5. The method of claim 1, wherein the roadway condition data comprises at least speed data.

6. The method of claim 1, wherein the high beam data comprises a length of time that a high beam was active.

7. The method of claim 1, wherein the high beam data comprises time active, duration, and location data for a high beam event.

8. The method of claim 1, wherein the first sensor and second sensor are integrated into a vehicle.

9. A computer-readable, non-transitory medium storing a program that causes a computer to execute a method comprising:
    collecting high beam data by a first sensor for a location on a road segment;
    collecting ambient light data by a second sensor for the location on the road segment;
    calculating, by a processor, a high beam confidence value as a function of the high beam data and the ambient light data;
    generating, by the processor, a data message including the high beam confidence value; and
    transmitting the data message including the high beam confidence value to a navigation service provider.

10. The method of claim 9, further comprising:
    comparing the high beam confidence value against a confidence threshold; wherein the data message is generated when the confidence threshold is met or exceeded.

11. The method of claim 9, wherein the high beam data and ambient light data is collected during a nighttime period of a day.

12. The method of claim 9, wherein the high beam data comprises a length of time that a high beam was active.

13. The method of claim 9, wherein the navigation service provider is located in a cloud computing network.

14. The method of claim 9, further comprising:
    collecting weather data by a third sensor for the location on the road segment; wherein the high beam confidence value is calculated as a function of the weather data.

15. The method of claim 9, further comprising:
    collecting traffic data by a third sensor for the location on the road segment; wherein the high beam confidence value is calculated as a function of the traffic data.

16. An apparatus for providing navigation services, the apparatus comprising:
    a first sensor configured to monitor a high beam event of a vehicle and generate high beam data;
    a processor configured to calculate a high beam confidence value as a function of the high beam data; and
    a transmitter configured to transmit the high beam confidence value to a navigation service provider.

17. The apparatus of claim 16, further comprising:
    a second sensor configured to monitor ambient light and to generate ambient light data; wherein the ambient light data is used to calculate the high beam confidence value.

18. The apparatus of claim 16, wherein the high beam data comprises time active, duration, and location data for a high beam event.

19. The apparatus of claim 16, wherein the high beam confidence value indicates a level of confidence that the high beam event occurred in response to a low level of roadway illumination.

20. A method using high beam data to augment a geographic database, the method comprising:
- receiving a high beam confidence value, wherein the high beam confidence value is indicative of whether a vehicle's high beams were active on a low illumination road segment;
- calculating, by a processor, a high beam frequency for the road segment based on the high beam confidence value; and
- augmenting, by the processor, the geographic database by including the high beam frequency for the road segment.

* * * * *